B. L. CUSHING.
QUANTITY STOP FOR MEASURING PUMPS.
APPLICATION FILED JAN. 5, 1917.
1,289,684.
Patented Dec. 31, 1918.
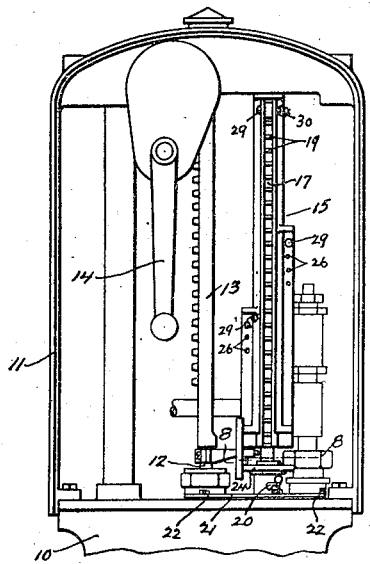
Fig. 1.
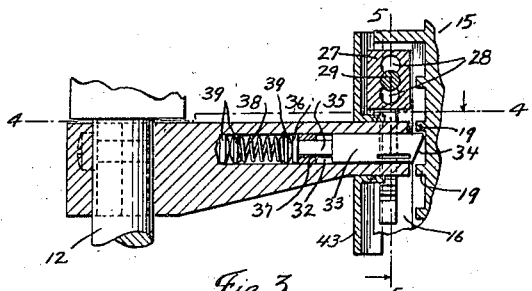
Fig. 3.
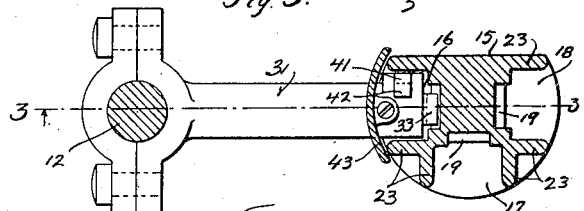
Fig. 4.
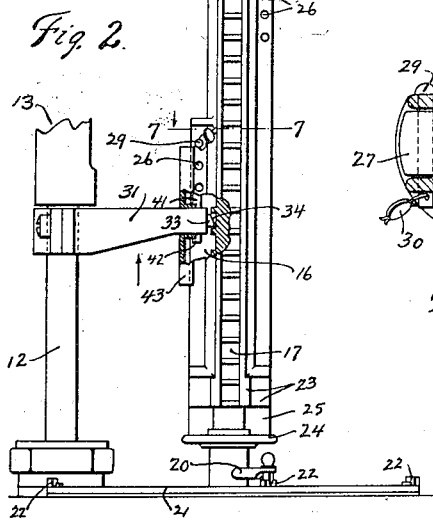
Fig. 2.
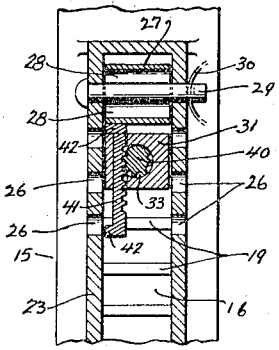
Fig. 5.
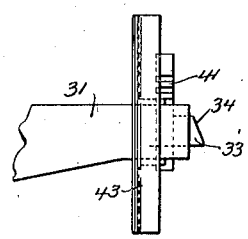
Fig. 6.
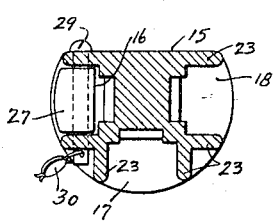
Fig. 7.
Fig. 8
INVENTOR
Bruce L. Cushing
BY
J. W. Ellis
ATTORNEY

UNITED STATES PATENT OFFICE.

BRUCE L. CUSHING, OF BUFFALO, NEW YORK.

QUANTITY-STOP FOR MEASURING-PUMPS.

1,289,684.    Specification of Letters Patent.    Patented Dec. 31, 1918.

Application filed January 5, 1917. Serial No. 140,720.

*To all whom it may concern:*

Be it known that I, BRUCE L. CUSHING, a citizen of the United States of America, and a resident of Buffalo, county of Erie, and State of New York, have invented a certain new and useful Quantity-Stop for Measuring-Pumps, of which the following is a specification.

It is well known to those skilled in the art, that in pumps where the piston rod of the measuring cylinder is raised until it contacts with the previously set quantity stop, the dealer may dispense fraudulent measures by returning the piston before it has reached the stop.

The principal object of my invention has been to overcome the possibility of fraud and to provide a quantity stop of such a nature, that the piston of the measuring cylinder cannot be reversed until it has completed its full predetermined stroke in both directions.

Another object has been to provide a stop which may be easily and conveniently substituted for those at present in use on gasolene measuring pumps.

Furthermore, my device does not complicate the operation of the pump, but is a device which is simple and easy to operate and which will not easily get out of order.

The above objects and advantages have been accomplished by the device shown in the accompanying drawings, of which:—

Figure 1 is a fragmentary side elevation of a typical gasolene measuring pump with my quantity stop attached thereto.

Fig. 2 is an enlarged side elevation showing my quantity stop.

Fig. 3 is an enlarged sectional, fragmentary view taken on line 3—3 of Fig. 4, showing the details of my device.

Fig. 4 is a sectional, plan view of the same, taken on line 4—4 of Fig. 3.

Fig. 5 is a sectional elevation of the same taken on line 5—5 of Fig. 3.

Fig. 6 is a fragmentary view of the stop arm.

Fig. 7 is an enlarged, fragmentary, sectional, plan view of the stop column, taken on line 7—7 of Fig. 2, showing the position of one of the adjustable stops.

Fig. 8 is an enlarged, fragmentary, plan view taken on line 8—8 of Fig. 1, showing a quantity indicator and arm.

In the drawings, 10 represents the lower part and 11 the casing of a typical gasolene measuring pump. In this type of pump, as is well known, the piston rod 12 of the dispensing cylinder is operated by means of an attached rack 13, through suitable gearing operated by a handle 14.

15 is the stop column of my device, which is rotatably mounted within the casing in place of the usual stop rod furnished with the pumps of this type. This column is preferably circular along its operating face and is provided preferably on three sides with longitudinal channels 16, 17 and 18, formed by the flanges 23 and varying from one another in length according to the different amounts to be measured. These channels are arranged preferably at right angles to each other and at the bottom of each channel is provided a series of projecting teeth 19, forming a ratchet to be hereinafter described. At the bottom of the stop column is arranged a quantity arm 20 which moves over the quantity sector 21 and is engageable with any one of a number of notches 22, bearing quantity indications, whereby any one of the sides of the column may be brought into operative position.

At the lower end of the stop column is provided an annular stop flange 24 with an annular recess 25, arranged between it and the bottom of the flanges 23. A plurality of apertures 26 are formed through each pair of flanges 23 near the upper end of each of the channels 16, 17 and 18, and arranged between the flanges in each of these grooves is an adjustable stop 27. Each of these adjustable stops is provided with a series of apertures 28, whose pitch is preferably one-quarter of the pitch between the apertures 26 formed in the flanges 23.

As shown in the drawings, three apertures 28 are provided so that a sensitive adjustment of these stops may be had. A pin 29 is passed through any two opposite apertures 26 and through the registering aperture in the stop, when the stop has been accurately set. The pin is provided with an aperture at its outer end, through which a seal 30 may be passed. The purpose of the stop flange 24 and the adjustable stops 27 will be referred to hereinafter.

31 is the stop arm of my device which is clamped in the usual manner to the piston rod 12 of the dispensing cylinder. This arm is arranged to pass in between any pair of registering flanges 23 and it is formed in its outer end with a hole 32. Within the outer end of the hole 32 is rotatably mounted a stop pin 33. This pin is formed on its outer end with an inclined face 34, of such a proportion as to pass over the teeth 19 as the pin is in motion. The inner end of the pin is provided with a reduced peripheral portion 35, having an integral collar 36 at the rear end thereof. A split ring 37 is arranged over the reduced portion 35 and is forced into the hole 32. This ring provides a stop for limiting the outward travel of the pin. 38 is a helical spring which is arranged near the bottom of the hole 32. Convex washers 39 are arranged at each end of the spring whereby the friction produced by its tension may be reduced. The purpose of this spring is to keep the pin 33 in its outermost position. The pin is provided near its outer end with gear teeth, thus forming a pinion 40. 41 is a rack, which is slidably arranged in a vertical position in the outer end of the stop arm 31. This rack is provided preferably with a flange 42 at each end thereof, which provide abutting faces for the rack and stops for limiting its travel. The teeth of the rack are engageable with the teeth of the pinion 40 of the pin 33. 43 is a guard, which is secured to the outer end of the stop arm 31 and preferably circular in shape, so as to conform to the general shape of the stop column. The purpose of this guard is to prevent the rack from being tampered with and being reversed before the stop arm has reached the end of its stroke.

Referring now particularly to Fig. 2, it will be seen that the pin 33 is in such a position that the inclined face 34 will ride over the teeth 19 and permit the stop arm 31 to be raised. When the pin is in this position, the rack 41 will be in its uppermost position and when the arm 31 is near any one of the upper stops, the upper end of the rack 41 will come in contact therewith, and as the arm 31 continues to rise, the rack will be forced downwardly to its lowermost position. When the rack is moved from its uppermost to its lowermost position, the pin 33 will be revolved through 180°, thereby reversing the position of the inclined surface 34 in which position it will permit the arm to be moved downwardly, as shown in Fig. 3. As the arm 31 is moved from the position shown in Fig. 3 to its lowermost position, or that shown in Fig. 1, the inclined surface 34 will ride over the teeth 19 until the arm is near its lowermost position, whereupon the lower end of the rack will engage with the annular stop ring 24 and reverse the position of the pin 33.

It will be seen that when the stop arm is in its lowermost position, the pin 33 will be disposed within the annular recess 25. When in this position, the stop column may be rotated by means of the handle 20 so as to bring any one of the channels 16, 17 or 18 into registering position with the stop arm.

It is clear, from the foregoing, that when my device is used, it is impossible to reverse the piston rod 12 before the stop arm 31 has been moved through its predetermined distance, thus obviating the possibility of fraud on the part of the operator.

Obviously, some modifications of the details herein shown and described may be made without departing from the spirit of my invention or the scope of the appended claims, and I do not, therefore, wish to be limited to the exact embodiment herein shown and described.

Having thus described my invention, what I claim is:—

1. A measuring pump comprising a rotatable stop column provided with a plurality of longitudinal flanges, thereby forming a plurality of longitudinal channels, a piston rod, a stop arm secured to the piston rod and engageable with any one of the channels, means permitting the stop arm to move in one direction only until it has reached the predetermined limit of its travel, and means for permitting the stop arm to travel in a reverse direction.

2. A measuring pump comprising a rotatable stop column provided with a plurality of longitudinal flanges, thereby forming a plurality of longitudinal channels, a piston rod, a stop arm secured to the piston rod and engageable with any one of the channels, ratchet means permitting the stop arm to move in one direction only until it has reached the predetermined limit of its travel, and means for permitting the stop arm to travel in a reverse direction.

3. A measuring pump comprising a rotatable stop column provided with a plurality of longitudinal flanges, thereby forming a plurality of longitudinal channels, a plurality of lateral teeth at the bottom of each channel, a piston rod, a stop arm secured to the piston rod, a ratchet pawl carried at the outer end of the stop arm and engaging with the teeth of the column, whereby the stop arm is permitted to move in one direction only until it has reached the predetermined limit of its travel, and means for permitting the stop arm to travel in a reverse direction.

4. A measuring pump comprising a rotatable stop column provided with a plurality of longitudinal flanges, thereby forming a plurality of longitudinal channels, a plurality of lateral teeth at the bottom of each channel, a piston rod, a stop arm secured to the piston rod and engageable with any one of the channels, a rotatably mounted pawl carried at the outer end of the stop arm and provided with gear teeth, and a gear rack slidably mounted in the outer end of the arm and engaging with the teeth of the pawl, whereby the pawl is held in a fixed position until it is reversed by the rack.

5. A measuring pump comprising a rotatable stop column provided with a plurality of longitudinal flanges, thereby forming a plurality of longitudinal channels, a plurality of lateral teeth at the bottom of each channel, an adjustable stop mounted at the upper end of each channel, an annular stop ring arranged below the channels, a rotatably mounted pawl carried at the outer end of the stop arm and provided with gear teeth, and a gear rack slidably mounted in the outer end of the arm and engaging with the teeth of the pawl, the rack having its ends engageable with the stops carried by the column, whereby the pawl is held in a fixed position until it is reversed by the rack.

6. A measuring pump comprising a rotatable stop column provided with a plurality of longitudinal flanges, thereby forming a plurality of longitudinal channels, a plurality of lateral teeth at the bottom of each channel, a piston rod, a stop arm secured to the piston rod and engageable with any one of the channels, a rotatably mounted pawl carried at the outer end of the stop arm and provided with gear teeth, a gear rack slidably mounted in the outer end of the arm and engaging with the teeth of the pawl, whereby the pawl is held in a fixed position until it is reversed by the rack, and a guard secured to the outer end of the stop arm.

7. A measuring pump comprising a rotatable stop column provided with a plurality of longitudinal flanges, thereby forming a plurality of longitudinal channels, a plurality of lateral teeth at the bottom of each channel, a piston rod, a stop arm secured to the piston rod and engageable with any one of the channels, a rotatably mounted pawl carried at the outer end of the stop arm and provided with gear teeth, a gear rack slidably mounted in the outer end of the arm and engaging with the teeth of the pawl, whereby the pawl is held in a fixed position until it is reversed by the rack, each pair of flanges of the column being provided near their upper ends with a plurality of oppositely arranged apertures and an adjustable stop at the upper end of each channel, each stop being formed with a plurality of apertures having a pitch equal to a fractional part of the pitch of the flange apertures, whereby a sensitive adjustment may be had.

8. A measuring pump comprising a rotatable stop column provided with a plurality of longitudinal flanges, thereby forming a plurality of longitudinal channels, a plurality of lateral teeth at the bottom of each channel, a piston rod, a stop arm secured to the piston rod and engageable with any one of the channels, a rotatably mounted pawl carried at the outer end of the stop arm and provided with gear teeth, a gear rack slidably mounted in the outer end of the arm and engaging with the teeth of the pawl, whereby the pawl is held in a fixed position until it is reversed by the rack, each pair of flanges of the column being provided near their upper ends with a plurality of oppositely arranged apertures, an adjustable stop at the upper end of each channel, each stop being formed with a plurality of apertures having a pitch equal to a fractional part of the pitch of the flange apertures, a pin passing through the registering apertures of the flanges and stop, and means for sealing the pin.

In testimony whereof, I have hereunto signed my name.

BRUCE L. CUSHING.

Copies of this patent may be obtained for five cents each, by addressing the "Commissioner of Patents, Washington, D. C."